United States Patent
Ripingill, Jr. et al.

(10) Patent No.: US 7,834,302 B2
(45) Date of Patent: Nov. 16, 2010

(54) EYE SAFETY PROTECTION FROM HIGH POWER LASER LIGHT

(75) Inventors: Allen E. Ripingill, Jr., Turners Falls, MA (US); Clark D'Souza, National City, CA (US); Jim Milton Counter, San Diego, CA (US)

(73) Assignee: Cubic Corporation, San Diego, CA (US)

(*) Notice: Subject to any disclaimer, the term of this patent is extended or adjusted under 35 U.S.C. 154(b) by 18 days.

(21) Appl. No.: 11/947,685

(22) Filed: Nov. 29, 2007

(65) Prior Publication Data

US 2008/0128585 A1 Jun. 5, 2008

Related U.S. Application Data

(60) Provisional application No. 60/868,290, filed on Dec. 1, 2006.

(51) Int. Cl.
*G01J 1/20* (2006.01)
*H01J 3/14* (2006.01)
*H01J 40/14* (2006.01)

(52) U.S. Cl. ............ 250/201.1; 250/216; 250/239

(58) Field of Classification Search ........... 250/214 VT, 250/216, 239, 221, 201.1; 313/524, 527, 313/528, 534, 537; 315/149
See application file for complete search history.

(56) References Cited

U.S. PATENT DOCUMENTS

| 5,729,010 A | * | 3/1998 | Pinkus et al. | 250/214 VT |
| 6,069,352 A | * | 5/2000 | Castracane et al. | 250/214 VT |
| 2006/0060758 A1 | | 3/2006 | David et al. | |

FOREIGN PATENT DOCUMENTS

GB 1133514 A 11/1968

* cited by examiner

*Primary Examiner*—Thanh X Luu
*Assistant Examiner*—Pascal M Bui-Pho
(74) *Attorney, Agent, or Firm*—Townsend and Townsend and Crew, LLP

(57) ABSTRACT

A laser safety device and method of protecting against harmful levels of radiation. The device includes a housing with first and second apertures. A photodetector generates a first signal corresponding to a level of radiation entering the housing through the first aperture. A control circuit receives the first signal and generates a drive signal based upon the level of the radiation. A reflector array which can include micro-electro-mechanical mirrors receives the drive signal and diverts a first part of the radiation away from an incident path extending from the first aperture to the second aperture. The reflector array allows a second part of the radiation to continue along the incident path at a safe level towards the second aperture. Optionally, the reflector array blocks the incident path so that substantially no radiation passes to the second aperture if unsafe levels are detected.

25 Claims, 6 Drawing Sheets

EYE SAFETY PROTECTION FROM HIGH POWER LASER LIGHT

CROSS-REFERENCES TO RELATED APPLICATIONS

This application claims the benefit of U.S. Provisional Application No. 60/868,290 filed on Dec. 1, 2006 and entitled HIGH POWER LASER EYE SAFETY PROTECTION which is incorporated herein by reference.

BACKGROUND OF THE INVENTION

As lasers are used in increasing numbers throughout society, human beings run the risk of being exposed to harmful levels of laser radiation. Laser devices can generate radiation at a number of different wavelengths which can be either visible or invisible to the human eye. As a result, it can be difficult to know when potentially harmful levels of radiation are present in the environment.

The effects of exposure to harmful levels of laser radiation are well known and include mild to severe skin burns. In addition, laser radiation can cause serious eye injury by damaging the cornea, retina, and lens. Different wavelengths of laser radiation are associated with different types of eye injury. For example, ultraviolet radiation may cause lens damage such as cataracts, whereas exposure to infrared radiation often results in retinal and corneal burns.

The propensity of laser radiation to cause eye damage is often expressed as a function of its wavelength and time. Along these lines, safety standards such as the American National Standards Institute (ANSI) Z136 set maximum permissible exposure (MPE) limits according to the wavelength of the laser and the duration of the exposure. One exposure level, for example, relates to the human aversion time for bright-light stimuli. In other words, how much exposure can be tolerated in the time it takes to blink. Other exposure levels may be used where the blink reflex is not applicable such as with infrared radiation.

Conventional approaches to laser eye safety have relied upon the ability of protective eyewear to absorb all or part of the laser radiation before it reaches the eye. Laser safety eyewear (LSE) is thus rated according to its optical density, or the amount of the incident laser radiation at a specified wavelength that can pass through to the unprotected eye. For added protection, safety standards usually define hazard zones within which LSE devices must be used and require the use of warning signs and physical barriers within each hazard zone.

Unfortunately, strict adherence to safety standards is not always possible. For example, military personnel may be exposed to high-powered lasers on the battlefield without knowing the type of laser involved and exposure may occur in situations where the use of cumbersome eye protection is not an option. Similarly, malicious use of laser devices may create serious hazards to aviation and maritime personnel using high-powered optics to monitor the passage of planes, ships, etc. Therefore, there is a need for improved protection against harmful levels of radiation.

BRIEF SUMMARY OF THE INVENTION

In accordance with embodiments of the present invention, a laser safety device and method of protecting against harmful levels of radiation are disclosed. In one embodiment, the laser safety device includes a housing with first and second apertures. The device also includes a photodetector that generates a first signal corresponding to a level of radiation entering the housing through the first aperture. A control circuit receives the first signal from the photodetector and generates a control signal in response thereto. The control signal actuates a reflector array and causes one or more reflectors in the array to divert a first part of the radiation away from an incident path extending from the first aperture to the second aperture while allowing a second part of the radiation to continue along the incident path towards the second aperture.

In another embodiment, the control signal is operative to cause the reflector array to divert substantially all of the radiation away from the incident path if the level of the radiation is detected as exceeding a threshold value. Alternatively, the reflector array may adjust the first part of the radiation such that a level of the second part does not exceed a threshold value. The threshold value, for example, may be established in accordance with a maximum permissible exposure level of the ANSI Z136 standard for eye safety. In one embodiment, the device also includes an absorber for receiving the first part of the radiation and dissipating its energy as well as a warning indicator to provide a visual cue when harmful levels of radiation are detected.

In one embodiment, the control circuit continuously adjusts the control signal responsive to changes in the level of the radiation. The control signal operates to increase the first part of the radiation if the level exceeds a predetermined threshold and to decrease the first part of the radiation if the level does not exceed the predetermined threshold. In one embodiment, the reflector array includes microminiature mirrors and, in response to the control signal, a first plurality of the microminiature mirrors is moved to divert the first part of the radiation away from the incident path.

In one embodiment, the laser safety device includes a wavelength selective filter configured to pass first wavelengths of the radiation to the photodetector. The signal generated by the photodetector corresponds to a level or amount of the first wavelengths. In some embodiments, the first wavelengths of the radiation include wavelengths shorter than 400 nm. The first wavelengths can also includes wavelengths ranging from 400-700 nm and/or wavelengths longer than 700 nm.

Further areas of applicability of the present invention will become apparent from the detailed description provided hereinafter. It will be understood that the detailed description and specific examples, while indicating various embodiments of the invention, are intended for purposes of illustration only and do not strictly limit the scope of the invention.

DETAILED DESCRIPTION OF THE INVENTION

In accordance with embodiments of the present invention, a laser safety device and method of protecting against harmful levels of radiation are disclosed. In one embodiment, the laser safety device includes a housing with first and second apertures. The device also includes a photodetector that generates a first signal corresponding to a level of radiation entering the housing through the first aperture. A control circuit receives the first signal from the photodetector and generates a control signal in response thereto. The control signal actuates a reflector array and causes one or more reflectors in the array to divert a first part of the radiation away from an incident path extending from the first aperture to the second aperture and to allow a second part of the radiation to continue along the incident path towards the second aperture.

Figure 1:
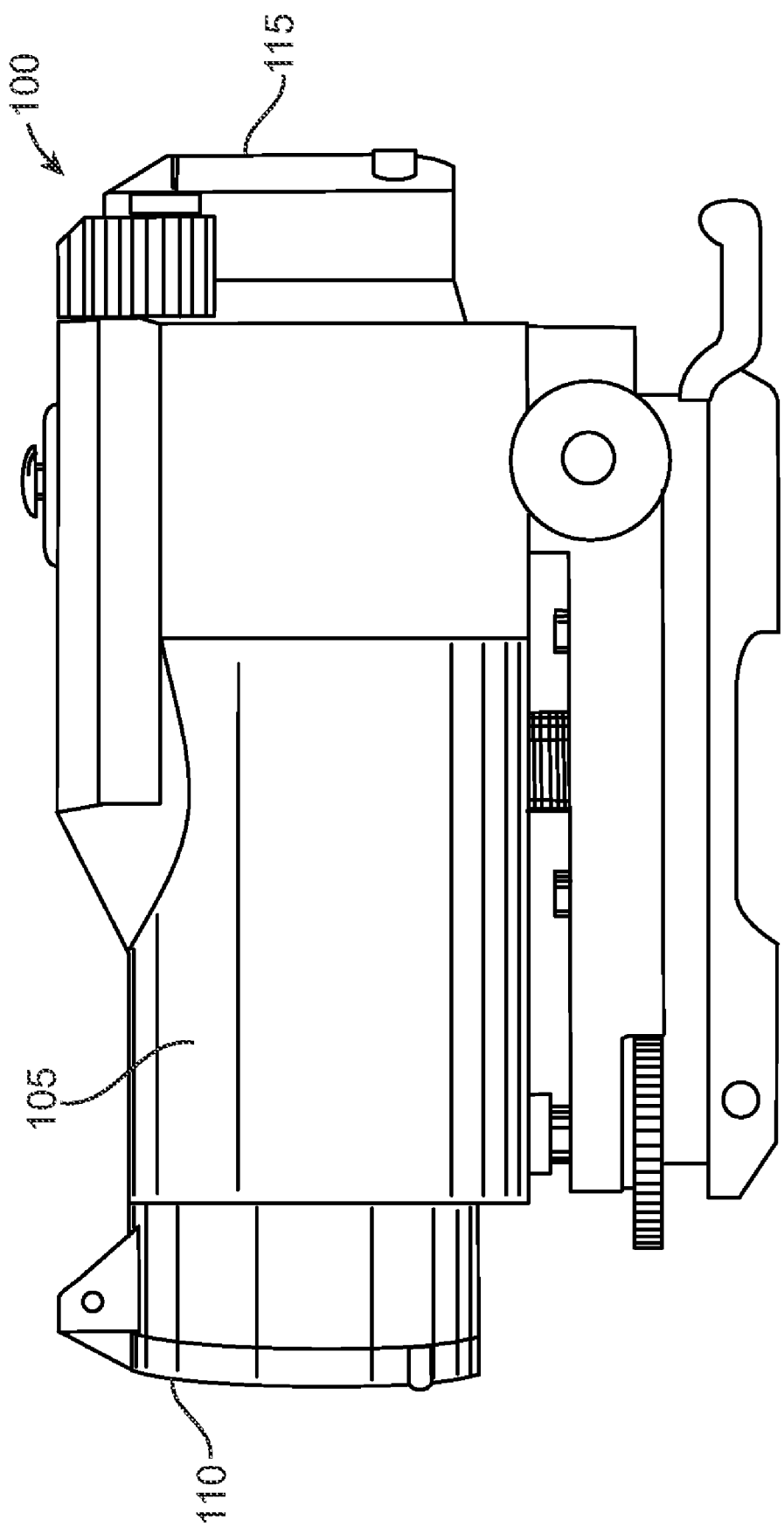
FIG. 1 shows an exemplary laser safety device in accordance with one embodiment of the present invention.

FIG. 1 shows an exemplary laser safety device 100 according to one embodiment of the present invention. As shown, device 100 is a weapon sight such as can be used with a rifle or handgun. Radiation enters a housing 105 through a receiving aperture 110 and exits the housing through an emitting aperture 115. A user looks into emitting aperture 115 in order to sight the weapon. Although device 100 is shown as a weapon sight, it is understood that embodiments of the present invention can include binoculars, monoculars, telescopes, safety goggles, and other devices which receive radiation through an aperture.

Receiving aperture 110 and emitting aperture 115 may each include lenses for focusing and magnifying the incoming radiation. For example, device 100 may collect radiation incident upon the receiving aperture 110, magnify it at one or more stages within housing 105, and deliver a focused and magnified beam at emitting aperture 115. Device 100 may be configured to establish a focal point for the radiation exiting from housing 105 at a convenient distance from emitting aperture 115 such that the eye can be positioned just behind device 100 for optimal viewing.

Device 100 includes electronics (not shown) for rapidly detecting harmful levels of incident radiation and diverting the radiation away from emitting aperture 115. Unlike conventional eye safety devices which rely upon properties of the protective material to absorb a specified amount of radiation before physical breakdown occurs, device 100 actively detects a level of the incident radiation and diverts its path to an absorber or non-reflective backstop within housing 105. The absorber dissipates energy so that it does not pass out of housing 105. Thus, device 100 can safely control high levels of laser radiation that would typically exceed the optical density (or carrying capacity) of conventional laser protective eyewear.

In some embodiments, device 100 is configured to detect and divert radiation at a specific wavelength or range of wavelengths. For example, it is known that the ocular media of the human eye passes radiation over a range from approximately 400 nm to approximately 1500 nm. Device 100 may be configured to detect radiation in one or more parts of the optical range and to prevent harmful levels of radiation from exiting through emitting aperture 115. In some embodiments, including night-use equipment, device 100 is configured to detect harmful levels of radiation over substantially the entire optical range and to divert it from the incident path that leads to the user's eye. In other embodiments, specific types of radiation such as the ultra-violet (UV) band, the visible band, and the infrared band (IR) or combinations thereof are detected and diverted.

By way of illustration, high-powered pulsed lasers having wavelengths from approximately 1000-1800 nm are often used in military applications. Such lasers may be used for illuminating targets or range-finding operations and, in many cases, they have instantaneous power ratings on the order of several kilowatts or more. In a battlefield environment, device 100 may be used by a soldier to scan the distant countryside at day or night. If an adversary points a laser device or laser designator at the soldier, laser radiation can enter device 100 through its lens system. Device 100 rapidly detects the harmful laser radiation and activates the eye protection circuitry. Thus, the laser radiation is diverted safely away from the soldier's eyes.

In some embodiments, device 100 also includes a warning indicator. The warning indicator can be configured to provide an audible and/or visual indication that high levels of incoming radiation have been detected. The warning indicator can be disposed within housing 105 such that it is visible to a user of device 100 through emitting aperture 115. In one embodiment, the warning indicator includes one or more light emitting diodes (LEDs) disposed within housing 105 and which can appear as a red dot near the edge of the field of view. Thus, continuing with the previous example, the warning indicator signals to the soldier that he/she is being illuminated by a laser and could therefore receive incoming fire. In an exemplary embodiment, device 100 includes a pulse-stretcher circuit which ensures that the warning indicator is lighted long enough to be clearly perceived by the soldier.

Figure 2:
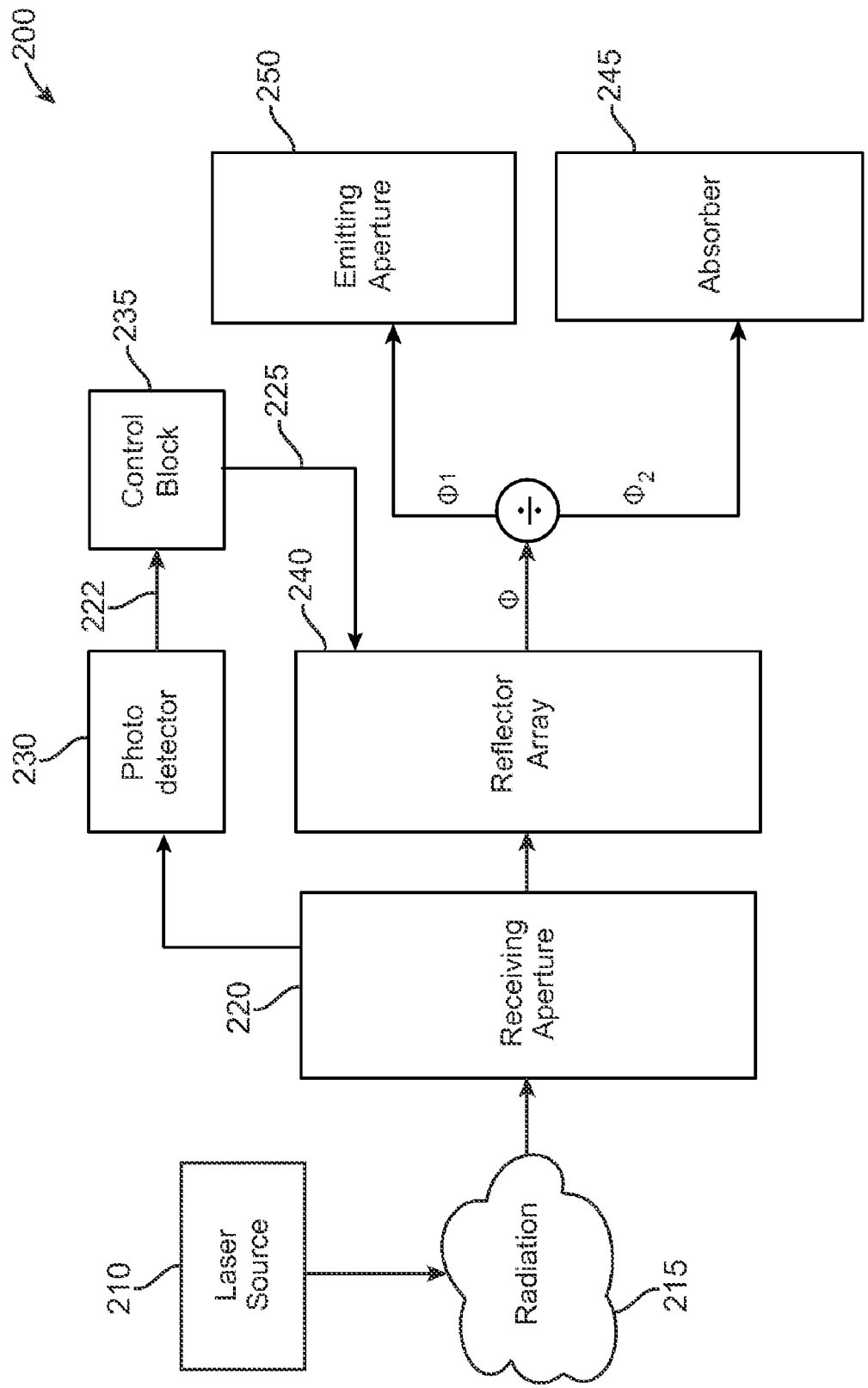
FIG. 2 is a diagram depicting various functional blocks for protecting against harmful levels of radiation in accordance with embodiments of the present invention.

FIG. 2 is a diagram 200 depicting various functional blocks for protecting against harmful levels of radiation in accordance with embodiments of the present invention. As shown, environmental radiation 215 represents all of the natural and man-made radiation present in the surroundings. Laser source 210 may include multiple laser sources producing radiation at one or more distinct wavelengths. The laser sources may be direct or diffuse and may be pulsed or continuous wave (CW). For example, the environment may include a distant shoreline surveyed by a sailor with high-powered binoculars and environmental radiation 215 may represent all of the light sources that are present in the area.

Radiation from environment 215 enters a user device through a receiving aperture 220. The user device, for example, may include a broad range of optical equipment such as weapon sights, binoculars, and telescopes. The user device may also include one or more electronic sensors which must be protected from radiation damage. For example, the user device may be a digital camera for which sensor protection is required. As shown, receiving aperture 220 is optically coupled to both photodetector 230 and reflector array 240 such that a portion of the incoming radiation is directed to each.

Photodetector 230 detects the incoming radiation and produces a signal representative of a level or amount of the radiation. For example, photodetector 230 may absorb photons of radiation incident at its surface and generate a flow of current that is proportional to their energy or that represents a radiant exposure value. Photodetector 230 can include one or more silicon detectors or an array of silicon detectors such as a charge-coupled device (CCD). Photodetector 230 can also include silicon, gallium arsenide, or germanium based photodiodes as well as other photosensors as known in the art.

In some embodiments, photodetector 230 is responsive to a broad range of wavelengths. Silicon photodiodes, for example, may be sensitive to radiation having wavelengths from 400-1000 nm. Germanium photodiodes, on the other hand, may provide sensitivity over a range extending from about 800 to about 1800 nm. Photodiodes may be fitted with wavelength selective filters or coatings to carefully control their responsivity. For example, in one embodiment, photodetector 230 includes three photodiodes each with a suitable wavelength selective coating limiting its sensitivity to the UV, visible, and IR bands respectively. In some embodiments, different combinations of photodiodes may be switched on/off in response to user settings for maximum flexibility and protection.

Photodetector 230 delivers one or more signals 222 to control block 235 representing the level (or levels) of radiation detected. Control block 235 receives the signals from photodetector 230 and generates one or more drive signals 225 at its output. One purpose of control block 235 is to control reflector array 240 such that radiation traveling along an incident path from receiving aperture 220 to emitting aperture 250 does not exceed a maximum permissible exposure level.

Representative exposure limits established by the ANSI Z136 safety standard are provided in Table 1 below. These exposure limits are intended merely as example values which can be utilized by control block 235 as discussed below. It will be recognized that control block 235 can use different exposure limits established by different governmental or regulatory bodies without deviating from the principles set forth herein.

TABLE 1

| Laser type | Wave-length (μm) | MPE Level (W/cm²) | |
|---|---|---|---|
| | | 0.25 s | 10 s |
| CO2 (CW) | 10.6 | — | $100.0 \times 10^{-3}$ |
| Nd:YAG (CW) | 1.33 | — | $5.1 \times 10^{-3}$ |
| Nd:YAG (CW) | 1.064 | — | $5.1 \times 10^{-3}$ |
| Nd:YAG (Q-switched) | 1.064 | — | $17.0 \times 10^{-6}$ |
| GaAs (Diode/CW) | 0.840 | — | $1.9 \times 10^{-3}$ |
| HeNe (CW) | 0.633 | $2.5 \times 10^{-3}$ | — |
| Krypton (CW) | 0.647 | $2.5 \times 10^{-3}$ | — |
| | 0.568 | $31.0 \times 10^{-6}$ | |
| | 0.530 | $16.7 \times 10^{-6}$ | |
| Argon (CW) | 0.514 | $2.5 \times 10^{-3}$ | — |
| XeFl (Excimer/CW) | 0.351 | — | — |
| XeCl (Excimer/CW) | 0.308 | — | — |

* Source: ANSI Z 136.1 (1993)

As can be seen, the maximum permissible exposure varies with wavelength and the duration of exposure. Typically, longer wavelengths are associated with higher MPE values. However, it will be noted that the ANSI standard MPE values are based upon irradiance (or the power per unit area). Thus, unsafe levels can exist at all wavelengths and eye safety devices must take this into account.

Control block 235 may include analog and/or digital circuits. In one embodiment, control block 235 includes memory elements for storing a collection of eye-safe values such as those presented in Table 1. The eye-safe values may correspond to the various radiation bands that can be detected by photodetector 230 and may be programmable for compliance with different regulatory standards. In some embodiments, the eye-safe values stored in control block 235 represent one or more thresholds that are less than the maximum permissible exposure.

In response to the level signals 222 from photodetector 230, control block 235 produces one or more drive signals 225 which determine whether the incident radiation will be diverted from the incident path. The drive signal may be continuous or discrete and may represent an eye-safe threshold value. For example, in one embodiment, control block 235 includes an integrator circuit. The integrator circuit outputs a signal corresponding to the cumulative irradiance of the photodetector. As the irradiance approaches the MPE limit within a predetermined interval of time, control block 235 uses drive signal 225 to interrupt the incident path and to thereby block the unsafe levels of radiation from reaching emitting aperture 250. It will be recognized that the time required to detect and respond to the unsafe level of radiation is very short and may be on the order of nanoseconds depending on the particular components used.

Reflector array 240 includes an array of reflecting elements which can be manipulated in various ways in response to drive signal 225. In one embodiment, reflector array 240 includes a plurality of microminiature mirrors. The microminiature mirrors, for example, may be part of a micro-electro-mechanical systems (MEMS) device. As known in the art, MEMS devices can comprise a memory chip with a matrix of thousands (or millions) of microminiature mirrors. Each mirror can be rapidly switched on and off by on-chip control circuitry and groups of mirrors can be controlled in common. In some cases, switching time for the mirror elements may be on the order of nanoseconds (e.g., switching rates >1 GHz).

In one embodiment, reflector array 240 is configured so that the microminiature mirrors divide the incident radiation $\Phi$ into two parts ($\Phi_1$, $\Phi_2$) Prior to detecting unsafe levels of radiation, substantially all of the radiation $\Phi$ incident upon reflector array 240 is directed towards emitting aperture 250. For example, the microminiature mirrors may be programmed to remain at a first set of reflective angles such that $\Phi_1 \approx \Phi$ radiation is reflected along the incident path to emitting aperture 250.

When the incident radiation reaches an unsafe level, drive signal 225 causes reflector array 240 to divert radiation from the incident path to absorber 245. For example, some or all of the microminiature mirrors may change to a second position in response to drive signal 225 such that substantially all of incident radiation $\Phi$ is diverted to absorber 245. In this state, $\Phi_2 \approx \Phi$ and the incident path from receiving aperture 220 to emitting aperture 250 is effectively blocked or interrupted. Absorber 245 acts as a protective backstop and absorbs the $\Phi_2$ radiation without reflecting it. In some embodiments, absorber 245 is a fire-resistant material capable of dissipating high levels of radiant energy. As discussed below, reflector array 240 can also be configured to divert only a portion of radiation $\Phi$ thereby attenuating ($\Phi_2 < \Phi$) rather than blocking ($\Phi_2 \approx \Phi$) radiation along the incident path.

Figure 3:
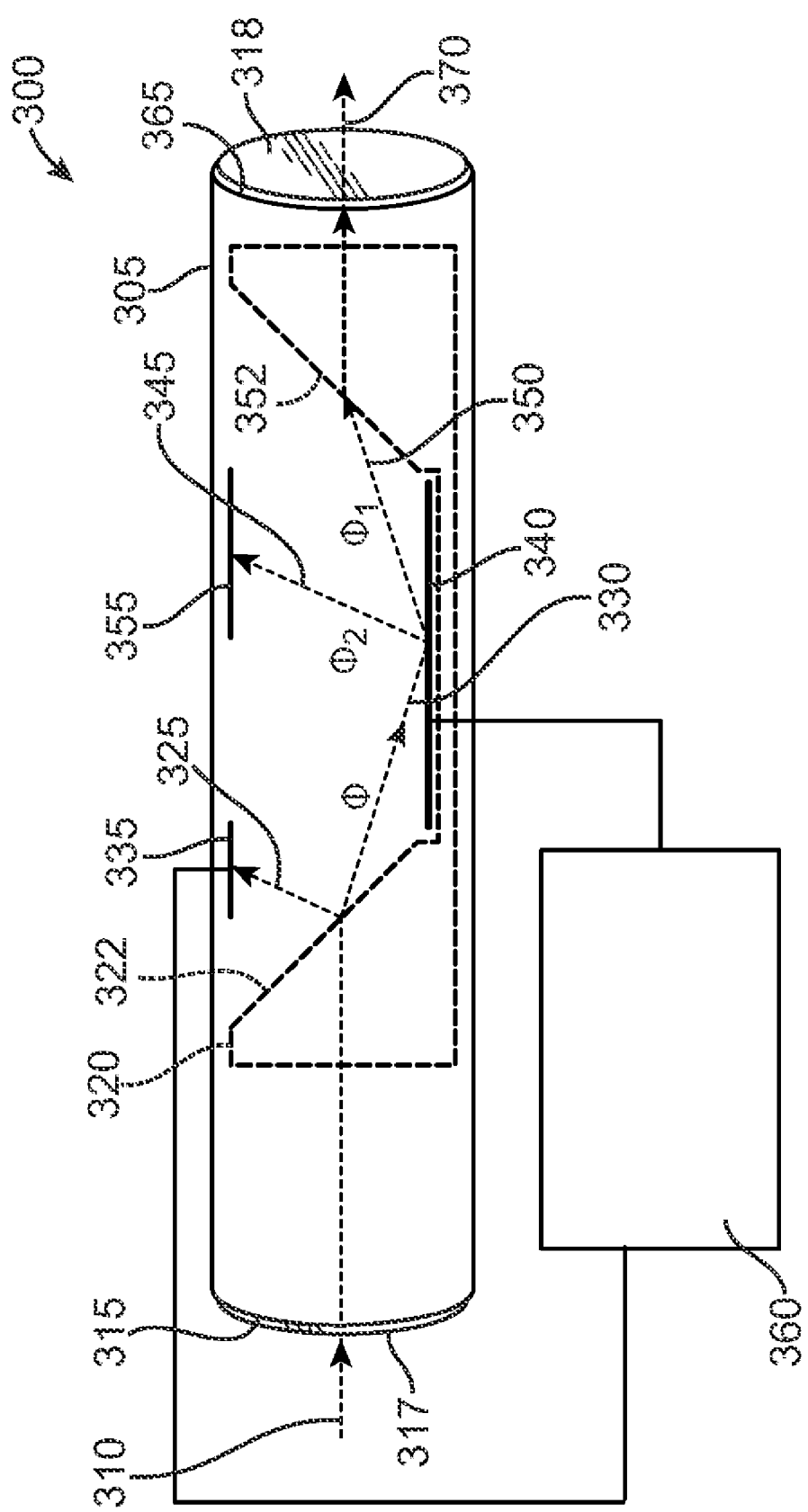
FIG. 3 is a schematic diagram of a laser safety device according to one embodiment of the present invention.

FIG. 3 is a schematic diagram of a laser safety device 300 according to one embodiment of the present invention. As shown, radiation enters housing 305 through receiving aperture 315. The incoming radiation follows a path through housing 305 and can exit housing 305 at emitting aperture 365. This incident path from receiving aperture 315 to emitting aperture 365 is represented by 310→330→350→370. Alternatively, the incoming radiation can be diverted to absorber 355 so that it does not reach emitting aperture 365. The diverted path is represented by 310→330→345.

As shown, lenses 317, 318 are included at receiving and emitting apertures 315, 365 respectively. After entering housing 305 through lens 317, the incoming radiation passes into prism 320. In some embodiments, prism 320 is a dove-type prism having faces 322, 352 which control the direction of the incoming radiation. At a first face 322, a part of the incoming radiation is directed along a path 325 to a photodetector 335 disposed above prism 320. The remainder of the incoming radiation $\Phi$ travels along path 330 to microminiature mirror array 340. Lenses 317, 318 provide an image inversion to correct for the inversion introduced by dove prism 320 so that the image seen at emitting aperture 365 is oriented correctly. In one embodiment, lenses 317, 318 are integrated into dove prism 320 and need not be separately positioned about the apertures.

Photodetector 335 is electrically coupled to control block 360. Photodetector 335, control block 360, and microminiature mirror array 340 may be as discussed in connection with FIG. 2 and therefore a further discussion of their respective functions is omitted for clarity. Photodetector 335 provides one or more signals corresponding to a level or amount of the incoming radiation to control block 360. Control block 360, in turn, is electrically coupled to microminiature mirror array 340 and generates a drive signal in response to input from photodetector 335.

The drive signal controls operation of microminiature mirror array 340. In response to the drive signal, array 340 directs a first part of radiation $\Phi_1$ along path 350 and a second part of the radiation $\Phi_2$ along path 345. Radiation $\Phi_2$ is received at absorber 355 and does not continue along the incident path from receiving aperture 315 to emitting aperture 365. Radiation $\Phi_1$ is directed to the second face 352 of prism 320 where it is passed towards emitting aperture 365 along path 370. In this way, harmful levels of radiation are prevented from exiting housing 305 through emitting aperture 365.

The drive signal may also actuate a warning indicator. In an exemplary embodiment, the warning indicator includes one or more LEDs disposed within housing 305. When activated, the warning indicator generates a dot or other visual cue which can be seen through emitting aperture 365 by a user of device 300. Alternatively, the warning indicator may generate an audible tone or a combination of visual and audible signals. In some embodiments, the warning indicator includes additional information such as the type of harmful radiation encountered, the approximate power level of the radiation, and/or an estimate of the location from which the radiation originated. For example, the warning indicator may receive approximate coordinates of the harmful laser source from a sighting system and convey the coordinates together with other relevant information about the laser source to a user of device 300.

In some embodiments, laser safety device 300 can be configured to either block or attenuate radiation detected as being harmful. For example, control block 360 may include a mode select switch that can be selected by a user. When it is determined that an amount of incoming radiation will exceed a maximum permissible exposure level, control block actuates microminiature mirror array 340 to divert radiation from the incident path. If the mode select switch is set to 'block', then substantially all of the incident radiation $\Phi$ is diverted to absorber 355 ($\Phi_2 \approx \Phi$).

However, if the mode select switch is set to 'attenuate', control block 360 diverts a portion of the incident radiation $\Phi$ to absorber 355 and allows a portion to pass through to emitting aperture 365. This avoids instantaneous blanking of the field of view through gradually darkening until useful information is no longer available. If control block 360 determines that a level of the incident radiation will exceed MPE limits, it can reduce the $\Phi_1$ radiation in predetermined increments to maintain eye-safe levels. For example, based upon the level of the incident radiation, control block 360 can cause microminiature mirror array 340 to divert 10% of radiation $\Phi$ to absorber 355 via path 345. If unsafe levels persist, the amount diverted $\Phi_2$ can be incrementally increased to, say, 30%, 45%, 60% and so on until laser safety device 300 is effectively darkened.

Attenuation mode can also be extended to cover rapid changes in ambient light levels which do not represent harmful radiation. Referring to FIGS. 1 and 3 concurrently, laser safety device 300 can be combined with weapon sight 100. Weapon sight 100 can then be set to attenuate rather than block incoming radiation. In this case, if light conditions change abruptly, control block 360 operates to control light level $\Phi_1$ so as to avoid momentary blindness associated with abrupt change. In other words, control block 360 can be configured to switch mirrors of mirror array 340 to gradually increase the amount of light $\Phi_1$ exiting the emitting aperture 365 over a time period that is consistent with an ability of the human eye to adjust to changing light conditions.

Figure 4:
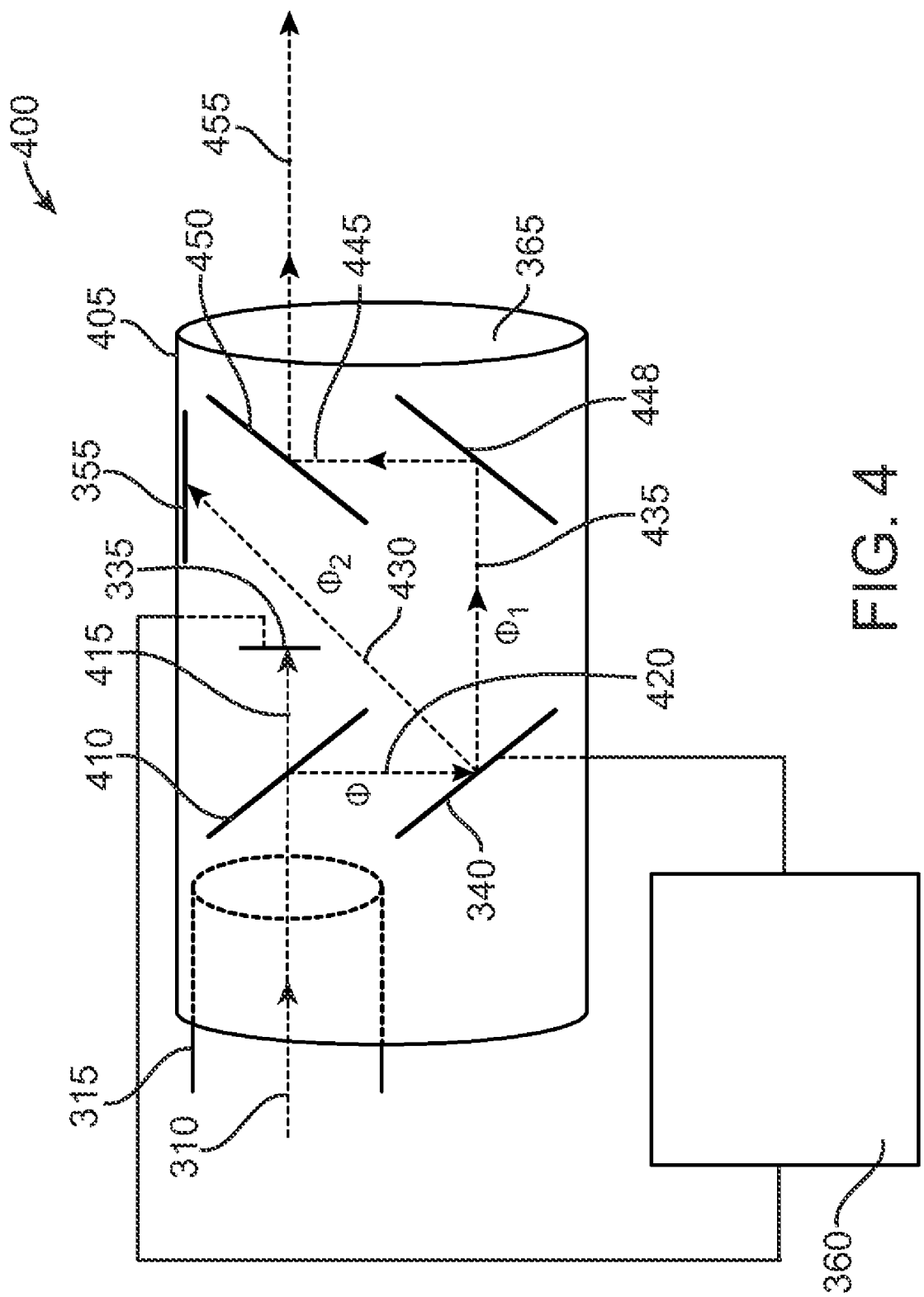
FIG. 4 is a schematic diagram of a laser safety device according to another embodiment of the present invention.

FIG. 4 is a schematic diagram of a laser safety device 400 according to another embodiment of the present invention. As shown, incoming radiation follows an offset path from receiving aperture 315 to emitting aperture 365. This embodiment is thus suitable for use with a variety of offset optic devices, such as telescopes and binoculars, and can serve as a direct replacement for optics that are not laser eye safe.

Incoming radiation enters housing 405 through receiving aperture 315. Within housing 405, the incoming radiation is directed to beam splitter 410. Beam splitter 410 may include a partially reflective mirror which allows one portion of the radiation to pass through along path 415 and reflects another portion of the radiation $\Phi$ downward along path 420. Radiation traveling along path 415 is received at photodetector 335. Photodetector 335 detects a level or amount of the radiation and sends one or more signals to control block 360 as previously discussed.

Control block 360 actuates reflector array 340 to divide incident radiation $\Phi$ between paths 430 and 435. In response to signals from control block 360, reflector array 340 directs a first part $\Phi_1$ of incident radiation $\Phi$ along path 435 and a second part $\Phi_2$ along path 430 to absorber 355. Absorber 355 deadens radiation $\Phi_2$ and dissipates its energy without reflection.

Radiation $\Phi_1$ follows path 435 to a first reflector 448 which directs it along path 445 to a second reflector 450. First and second reflectors 448, 450 may be mirrors, highly polished metal surfaces, plastic with a metalized coating, or other materials capable of transmitting substantially all of the incident radiation at a desired wavelength along the incident path towards emitting aperture 365. In some embodiments, reflectors 448, 450 are fixedly attached within housing 405 and ruggedized to prevent movement or repositioning. In other embodiments, each reflecting element 410, 340, 448, 450 can be independently adjusted for focusing and fine tuning laser safety device 400.

Radiation $\Phi_1$ exits housing 405 through aperture 365 at an eye-safe level. Thus, incoming radiation follows the incident path 310→420→435→445→455 from receiving aperture 315 to emitting aperture 365 and may be blocked or attenuated along the incident path by reflector array 340 as previously discussed.

Figure 5:
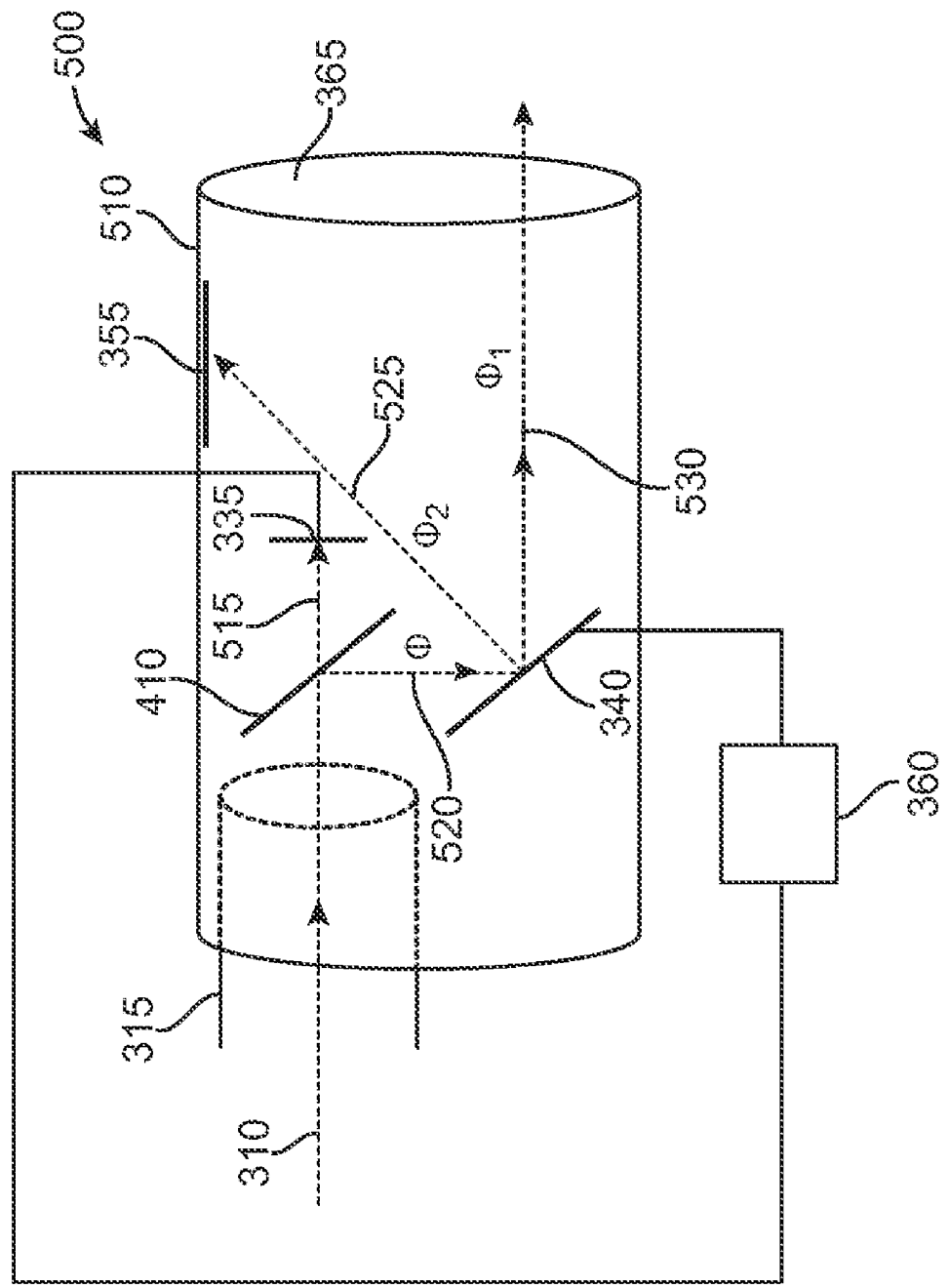
FIG. 5 is a schematic diagram of a laser safety device according to a further embodiment of the present invention.

FIG. 5 is a diagram of a laser safety device 500 according to a further embodiment of the present invention. As shown, laser safety device 500 also provides an offset incident path from receiving aperture 315 to emitting aperture 365 which may be suitable for use with conventional optical devices lacking laser eye protection.

Radiation enters laser safety device 500 through receiving aperture 315 along path 310. Radiation from path 310 is divided by beam splitter 410 such that one portion passes through to photodetector 335 along path 515 and another portion $\Phi$ is directed to reflector array 340. This embodiment is similar to laser safety device 400 except that the first and second reflectors 448, 450 are omitted and radiation $\Phi_1$ is allowed to exit emitting aperture 365 along path 530. Thus, radiation $\Phi_1$ can pass out of housing 510 at approximately the level of reflector array 340 for additional flexibility in device design and construction. As shown, diverted radiation $\Phi_2$ is directed along path 525 to absorber 355.

Figure 6:
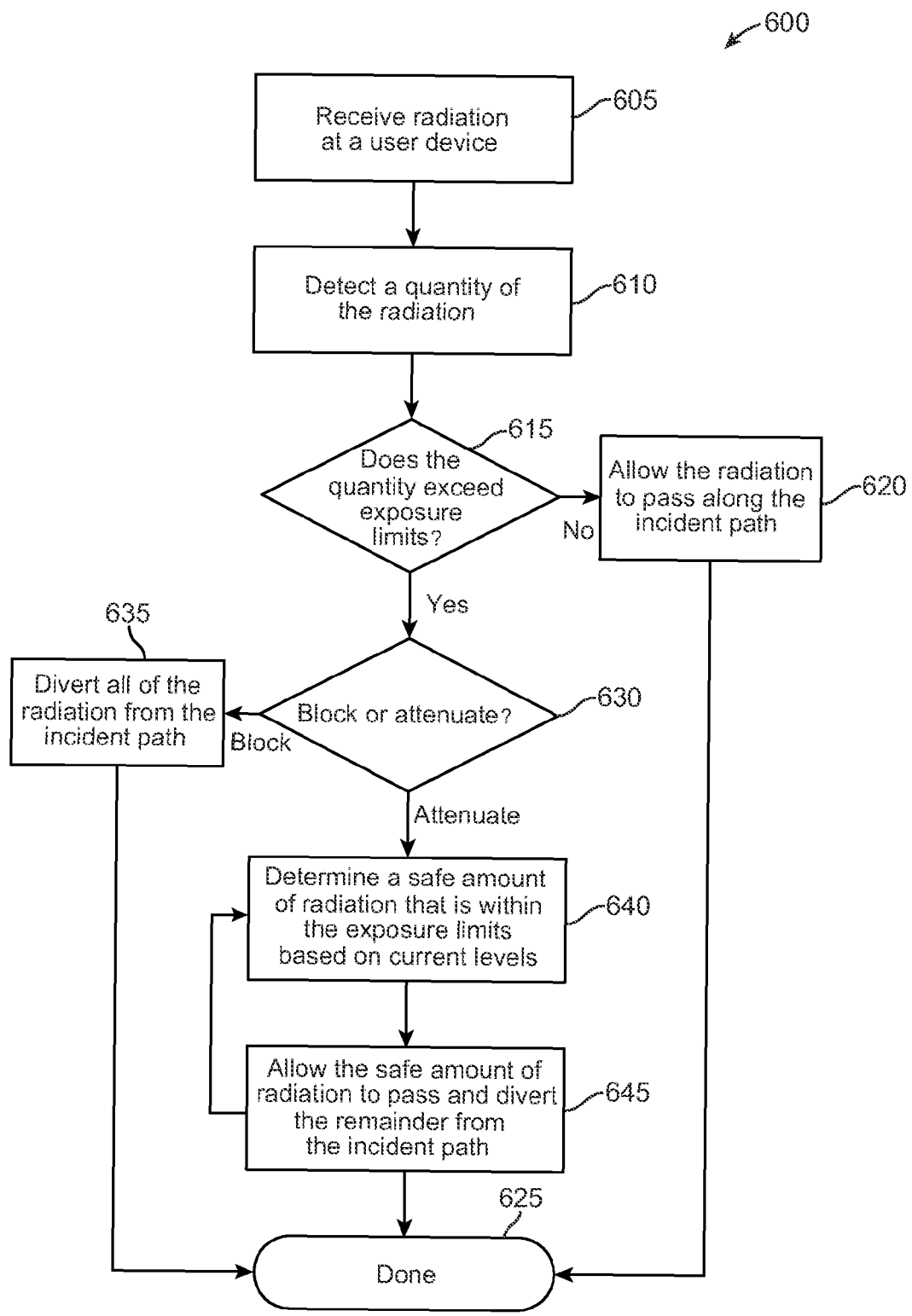
FIG. 6 is a flowchart depicting steps for protecting against harmful levels of radiation in accordance with one embodiment of the present invention.

FIG. 6 is a flowchart illustrating steps 600 for protecting against harmful levels of radiation in accordance with one embodiment of the present invention. At step 605, radiation is received at a user device. The user device may include laser safety eyewear intended to protect against harm from direct or indirect exposure to a particular category of lasers, such as infrared lasers, or intended to protect against a broad range of wavelengths which can harm the eye at unsafe levels. The user device may also include electronic sensors such as CCD arrays which can be damaged by excess levels of radiation. For example, the device may be fitted to a digital camera or telescope to protect its electronic sensors.

At step 610, a quantity of the radiation is detected. For example, an irradiance of the radiation may be detected as power per unit area (e.g., $W/cm^2$) at a specified wavelength or over a range of wavelengths. Alternatively, a power level of the radiation may be detected in terms of W/s or other suitable units. Next, at step 615, it is determined if the quantity detected exceeds exposure limits. This may involve comparing the quantity to a threshold value that is lower than permissible exposure limits or determining a trend based upon rate of change, etc. As step 620, the radiation is allowed to pass along an incident path if the detected quantity is determined to be within the exposure limits and processing completes at step 625.

If the quantity exceeds exposure limits, a decision is made either to attenuate the radiation or to block it altogether (step 630). This decision may correspond to a selectable operating mode of the user device or it may be pre-programmed into the device. For example, in the case of protective eyewear, it may be desirable to err on the side of caution by completely blocking radiation as soon as it reaches an unsafe level. On the other hand, when protecting electronic sensors, it may be appropriate to maintain a safe level by gradually reducing the amount of radiation and passing only an amount that is below the predetermined threshold. Thus, at step 635, a decision to block the radiation involves diverting it away from the incident path. This may include physically blocking or interrupting the incident path.

At step 640, a safe amount of radiation is determined. Suppose, for example, that the user device is intended to protect human eyes against exposure to a Krypton laser having a wavelength of 647 nm. Based upon the exposure limits of Table 1, the maximum permissible exposure to such laser radiation under ANSI Z136 is $2.5 \times 10^{-3}$ $W/cm^2$ for 0.25 s. In some embodiments, an initial threshold is established at approximately 90% of the MPE value. The amount of radiation allowed to pass along the incident path is attenuated if the quantity of radiation is detected as exceeding the initial threshold. For example, 10% of the incoming radiation might be diverted away from the incident path by moving 10% of the mirrors in a MEMS array and thereby effecting a 10% reduction in the exposure.

At step 645, the attenuated safe level of radiation is allowed to pass along the incident path while the remainder is diverted away from the incident path. As illustrated, these adjustments can be periodically updated so that the maximum safe amount of radiation is allowed to pass along the incident path. Thus, more radiation may be allowed to pass if exposure levels drop, whereas the amount of radiation allowed to pass may be further reduced if required to maintain a safe level. In this way, radiation along the incident path is maintained at eye-safe levels.

The preceding description includes preferred exemplary embodiment(s) only, and is not intended to limit the scope, applicability or configuration of the invention. Rather, the description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set forth in the appended claims.

Specific details have been given in the description to provide a thorough understanding of the embodiments. However, it will be recognized by one of ordinary skill in the art that the embodiments may be practiced without these specific details. For example, individual circuits may not be shown in block diagrams in order not to obscure the embodiments in unnecessary detail. In other instances, well-known circuits, processes, algorithms, structures, and techniques may be shown without unnecessary detail in order to avoid obscuring the embodiments.

What is claimed is:

1. A laser safety device, comprising:
   a housing having first and second apertures;
   a beam splitter optically coupled to the first aperture and configured to divide radiation entering the housing through the first aperture into a first part and a second part;
   a photodetector optically coupled to the second part of the radiation and configured to detect a level of the second part of the radiation;
   a control circuit coupled to an output of the photodetector and configured to generate a control signal based upon the level of the second part of the radiation detected by the photodetector; and
   a reflector array optically coupled to the first part of the radiation and configured to selectively divert the first part of the radiation away from an optical path extending from the first aperture to the second aperture or allow the first part of the radiation to continue along the optical path towards the second aperture in response to the control signal,
   wherein the beam splitter is configured such that the optical coupling of the photodetector to the second part of the radiation is unchanged when the reflector array diverts the first part of the radiation from the optical path.

2. The device of claim 1 further comprising:
   an absorber configured to receive the first part of the radiation diverted from the optical path by the reflector array and to dissipate an energy associated with said first part of the radiation.

3. The device of claim 1 further comprising:
   a warning indicator configured to provide a visual cue indicating that an unsafe level of radiation is detected.

4. The device of claim 1 wherein the reflector array comprises microminiature mirrors, and wherein a first plurality of the microminiature mirrors is moved in response to the control signal such that at least some of the first part of the radiation is diverted away from the optical path.

5. The device of claim 1 wherein the control signal is operative to cause the reflector array to divert substantially all of the first part of the radiation away from the optical path if the level of radiation is detected as exceeding a threshold value.

6. The device of claim 5 wherein the threshold value is established in accordance with a maximum permissible exposure level of the ANSI Z136 standard for eye safety.

7. The device of claim 1 wherein the reflector array adjusts the first part of the radiation such that radiation exiting the housing via the second aperture does not exceed a threshold value in response to the control signal.

8. The device of claim 1 wherein the photodetector detects the level of the second part of the radiation without interruption due to operation of the reflector array.

9. The device of claim 8 wherein the control signal is operative to vary an amount of the first part of the radiation diverted from the optical path in accordance with a maximum permissible exposure level for eye safety.

10. The device of claim 1 wherein the control circuit further comprises an integrator for integrating the output of the photodetector, and wherein the control signal varies according to an amount of radiation entering the housing during a predetermined time interval.

11. The device of claim 1 further comprising a wavelength selective filter configured to pass first wavelengths of the radiation to the photodetector, and wherein the output of the photodetector corresponds to a level of said first wavelengths.

12. The device of claim 11 wherein the first wavelengths of the radiation includes wavelengths in the range of about 400 nm to about 700 nm.

13. The device of claim 11 wherein the first wavelengths of the radiation includes wavelengths greater than approximately 700 nm.

14. The device of claim 1 wherein the reflector array comprises a micro-electro-mechanical mirror array.

15. A method of protecting against harmful levels of radiation at a receiver having a housing with first and second apertures, the method comprising:
receiving radiation into the housing through the first aperture;
dividing the radiation into a first part and a second part;
directing the second part of the radiation to a detector;
detecting a level of the second part of the radiation at the detector;
generating a drive signal based upon the level of the radiation at the detector; and
selectively diverting the first part of the radiation from an optical path extending to the second aperture in response to the drive signal, wherein the second part of the radiation is available at the detector when the first part of the radiation is diverted from the optical path.

16. The method of claim 15 further comprising:
providing a warning indicator to signal that an unsafe level of radiation is detected.

17. The method of claim 15 wherein selectively diverting the first part of the radiation comprises moving a plurality of the reflectors in response to the drive signal.

18. The method of claim 15 wherein selectively diverting the first part of the radiation comprises diverting substantially all of the radiation away from the optical path if the level of the radiation exceeds a predetermined value.

19. The method of claim 18 wherein the predetermined value is established in accordance with a maximum permissible exposure level of the ANSI Z136 standard for eye safety.

20. The method of claim 15 further comprising:
automatically adjusting an amount of the radiation diverted from the optical path based on a maximum permissible exposure level for eye safety; and
detecting without interruption the level of the second part of the radiation while the amount of the radiation diverted from the optical path is adjusted.

21. The method of claim 15 wherein generating the drive signal comprises integrating a signal representative of the level of the radiation at the detector, and wherein the drive signal varies according to an amount of radiation entering the housing during a predetermined time interval.

22. The method of claim 15 wherein detecting a level of the radiation at the detector further comprises filtering the radiation by wavelength and detecting an irradiance of the filtered radiation.

23. The method of claim 22 wherein the filtered radiation comprises wavelengths in the range from about 400 nm to about 700 nm.

24. The method of claim 22 wherein the filtered radiation comprises wavelengths greater than approximately 700 nm.

25. A laser safety device comprising:
a housing having first and second apertures;
a beam splitter optically coupled to the first aperture and configured to divide radiation entering the housing into a first part and a second part;
a photodetector optically coupled to the second part of the radiation and configured to generate one or more first signals corresponding to a level of the second part of the radiation;
a memory configured to store eye safety information corresponding to wavelengths of the radiation that are detected by the photodetector;
a control circuit configured to receive the one or more first signals and to generate second signals indicative of whether the level of the second part of the radiation exceeds a threshold value determined in accordance with the eye safety information;
a warning indicator configured to receive select ones of the one or more second signals and to provide a visual cue if the first wavelengths exceed the eye-safe threshold; and
a micro-electro-mechanical mirror array configured to direct the first part of the radiation away from an optical path extending to the second aperture in response to an indication from the second signals that the second part of the radiation exceeds the threshold value,
wherein the beam splitter is configured to direct the second part of the radiation to the photodetector without interruption when the micro-electro-mechanical mirror array directs the first part of the radiation from the optical path.

* * * * *